(12) United States Patent
Kanno et al.

(10) Patent No.: US 6,577,761 B1
(45) Date of Patent: Jun. 10, 2003

(54) IMAGE PROCESSOR AND IMAGE PROCESSING SYSTEM

(75) Inventors: Hiroki Kanno, Kanagawa-ken (JP); Gaku Takano, Kanagawa-ken (JP)

(73) Assignees: Toshiba Tec Corporation, Tokyo (JP); Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/426,943

(22) Filed: Oct. 26, 1999

(30) Foreign Application Priority Data

Dec. 7, 1998 (JP) .......................... 10-347038

(51) Int. Cl.$^7$ ................................. G06K 9/00
(52) U.S. Cl. .................. 382/167; 382/254; 382/274; 358/518
(58) Field of Search .......................... 382/162, 167, 382/155, 156, 157, 254, 274, 275; 358/448, 518, 523, 519, 522, 520, 521, 452, 462; 706/15; 700/48

(56) References Cited

U.S. PATENT DOCUMENTS

| 4,885,705 A | 12/1989 | Choi .......................... 364/525 |
| 5,164,837 A | 11/1992 | Hirosawa .................... 358/296 |
| 5,467,202 A | * 11/1995 | Washio et al. .............. 358/404 |
| 5,774,230 A | 6/1998 | Goto .......................... 358/298 |
| 5,937,232 A | * 8/1999 | Taguchi et al. ............. 399/182 |
| 6,188,419 B1 | * 2/2001 | Katamoto et al. .......... 347/115 |
| 6,192,207 B1 | * 2/2001 | Yamamoto et al. ......... 399/299 |
| 6,204,867 B1 | * 3/2001 | Fujimoto et al. ........... 347/118 |
| 6,252,609 B1 | * 6/2001 | Kanno ......................... 345/501 |

FOREIGN PATENT DOCUMENTS

| JP | 3-255470 | 11/1991 |
| JP | 5-227338 | 9/1993 |
| JP | 6-178099 | 6/1994 |
| JP | 10-178584 | 6/1998 |

* cited by examiner

Primary Examiner—Jayanti K. Patel
Assistant Examiner—Ali Bayat
(74) Attorney, Agent, or Firm—Foley & Lardner

(57) ABSTRACT

The image processor includes an image input unit for reading and inputting an image of a document, a parameter input unit for inputting a parameter for image quality adjustment, a parameter storage unit for storing the parameter input by the parameter input unit, and a parameter decision unit for deciding an image quality parameter for adjusting the quality of an image input by the image input unit on the basis of the parameter stored by the parameter storage unit. Furthermore, the image processor includes an image processing unit for processing an image input by the image input unit on the basis of the image quality parameter decided by the parameter decision unit and an image output unit for outputting the image processed by the image processing unit.

9 Claims, 20 Drawing Sheets

| 0<br>($C_{11}$) | 1<br>($C_{12}$) | 0<br>($C_{13}$) |
|---|---|---|
| 1<br>($C_{21}$) | -4<br>($C_{22}$) | 1<br>($C_{23}$) |
| 0<br>($C_{31}$) | 1<br>($C_{32}$) | 1<br>($C_{33}$) |

PLEASE INPUT USER IDENTIFICATION INFORMATION

IMAGE PROCESSOR AND IMAGE PROCESSING SYSTEM

BACKGROUND OF THE INVENTION

1. Field of the Invention

The present invention relates to an image processor such as a digital color copying machine, for example, for reading and inputting a color document image by an image input means such as a color scanner, performing a predetermined image process such as image quality adjustment for this input image, and then outputting the image onto a paper by an image output means such as an electrophotographic color printer and an image processing system using this image processor.

2. Description of the Related Art

Generally in an image processor such as a digital color/monochromatic copying machine for reading a color image or a monochromatic image and forming a copied image thereof, the quality of an image to be copied is important.

However, the required image quality greatly varies with the kind of a document to be copied. For example, in the case of a picture document, the reproduction of color and gradation is important and the image quality faithful to the document is required. On the other hand, in a document in writing mainly composed of letters, the distinction of images is required more than the color of letters and a legible image quality is required.

Therefore, a conventional color/monochromatic copying machine has document modes (letter mode, picture mode, map mode, etc.) in which the quality of copied images is optimized in various kinds of documents and a user selects a document mode according to the kind of a document to be copied and copies images.

Furthermore, a problem on the image quality is a desire of the image quality of a user preparing copied images. Namely, even if document modes corresponding to various documents are selected, a case that they do not match with the desire of a user intending to copy images occurs often. In consideration of such a case, there are image quality adjustment modes (sharpness adjustment, density adjustment, hue adjustment, saturation adjustment, etc.) for adjusting the image quality provided and a user can obtain the satisfied image quality by operating the image quality adjustment modes.

As mentioned above, in a color/monochromatic copying machine, the image quality satisfied by a user cannot be decided uniformly according to the document kind and user's desire. Therefore, a user intending to copy images can obtain the image quality satisfied by himself using the document mode and image quality adjustment function.

However, these adjustment functions are hard to operate and there is a problem imposed that the image quality satisfied by a user cannot be always obtained. Furthermore, a problem also arises that repetitive copying several times until the satisfied image quality is obtained causes waste consumption of expendables such as such as papers and toner and an increase in copy cost.

Therefore, even if the image quality satisfied by a user cannot be obtained, he cannot copy images repeatedly so as to obtain the satisfied image quality and often gives up to copy though the satisfied image quality cannot be obtained. Furthermore, a copying machine may be used by many and unspecified persons and a problem also arises that the aforementioned problems vary with a user.

SUMMARY OF THE INVENTION

An object of the present invention is to provide an image processor and an image processing system for automatically learning the image quality desired by a user and outputting an image reflected by it.

According to the present invention, an image processor is provided. This image processor comprises an image input means for reading and inputting an image of a document, a parameter input means for inputting a parameter for image quality adjustment, a parameter storage means for storing the parameter input by the parameter input means, a parameter decision means for deciding an image quality parameter for adjusting the quality of an image input by the image input means on the basis of the parameter stored by the parameter storage means, an image processing means for processing an image input by the image input means on the basis of the image quality parameter decided by the parameter decision means, an image output means for outputting the image processed by the image processing means.

BRIEF DESCRIPTION OF THE DRAWINGS

FIG. 20 is a plan view showing an example of an input screen of a user identification information input unit;

DETAILED DESCRIPTION OF THE PREFERRED EMBODIMENTS

The embodiments of the present invention will be explained hereunder with reference to the accompanying drawings.

Firstly, the first embodiment will be explained.

Figure 1:
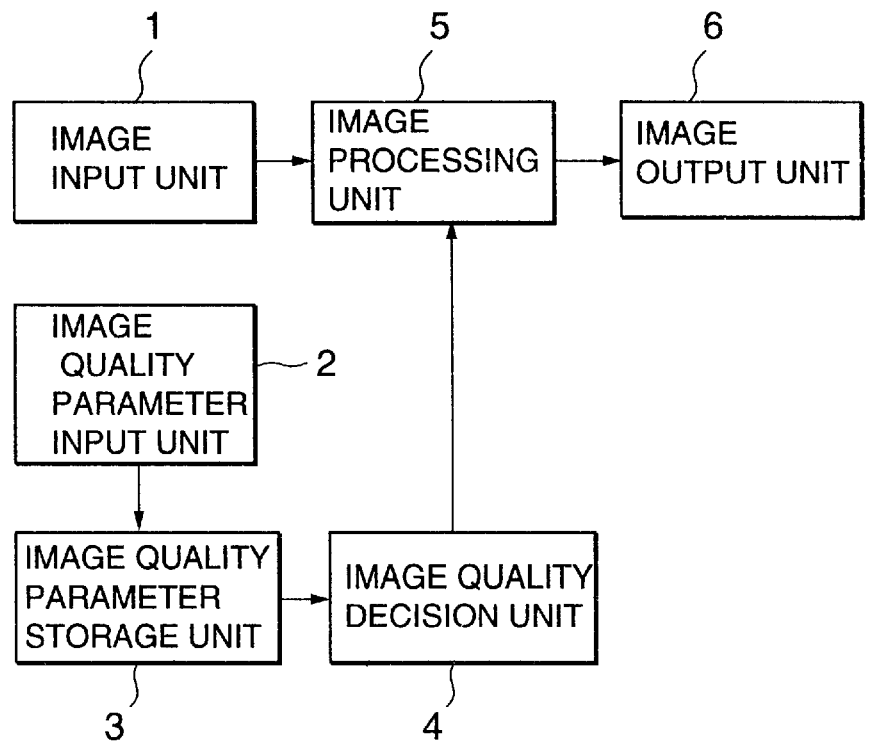
FIG. 1 is a block diagram schematically showing the constitution of a digital color/monochromatic copying machine of the first embodiment of the present invention.

FIG. 1 schematically shows the constitution of a digital color/monochromatic copying machine as an example of an image processor of the first embodiment. This copying machine comprises an image input unit 1 as an image input means, an image quality parameter input unit 2 as a parameter input means, an image quality parameter storage unit 3 as a parameter storage means, an image quality decision unit 4 as a parameter decision means, an image processing unit 5 as an image processing unit, and an image output unit 6 as an image output means.

Namely, images of various kinds of documents are read and input by the image input unit 1 and output from the image input unit 1 as R (red), G (green), and B (blue) image signals. From the image quality parameter input unit 2, a parameter for adjusting the image quality by a user according to his desire is input. The image quality storage unit 3 stores the parameter input by the image quality parameter input unit 2. The image quality parameter decision unit 4 decides an image quality parameter to be processed by the image processing unit 5 on the basis of the parameter stored in the image quality parameter storage unit 3. The image processing unit 5 inputs the image signals output from the image input unit 1 and processes the image signals on the basis of the image quality parameter decided by the image quality parameter decision unit 4. The image output unit 6 outputs the image signals processed by the image processing unit 5 as images.

Each unit will be explained hereunder in detail.

Firstly, the image input unit 1 will be explained. The image input unit 1 is, for example, a color scanner and has a document stand having a document cover which can be freely opened or closed. The image input unit 1 optically reads a color image including letters of a document set on the document stand, converts it into a digital signal (digital data) 8 bits long in each color for each unit pixel (for example, 400 dpi) which is vertically and horizontally divided into electric signals of three primary colors of R, G, and B, and outputs them respectively as signals R, G, and B.

Figure 2:
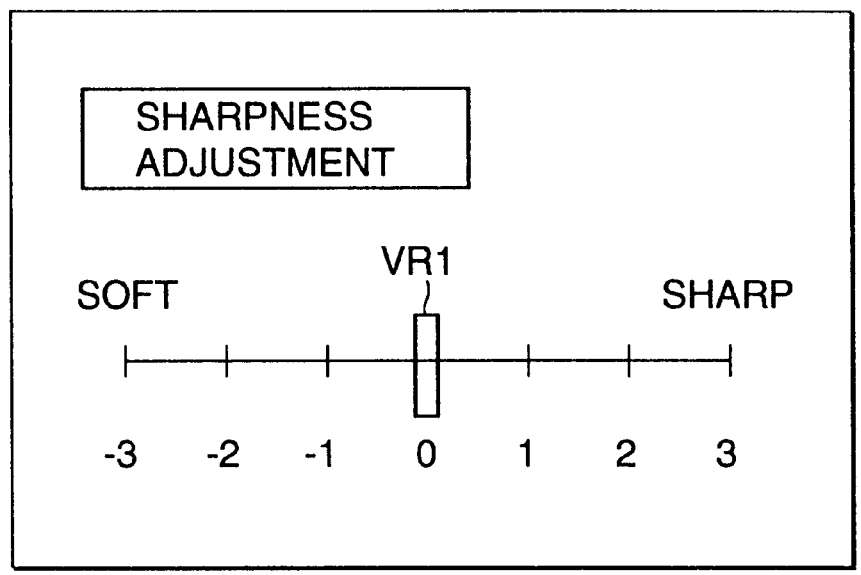
FIG. 2 is a plan view schematically showing a constitution example of a sharpness adjustment unit as an image quality parameter input unit.
Figure 3:
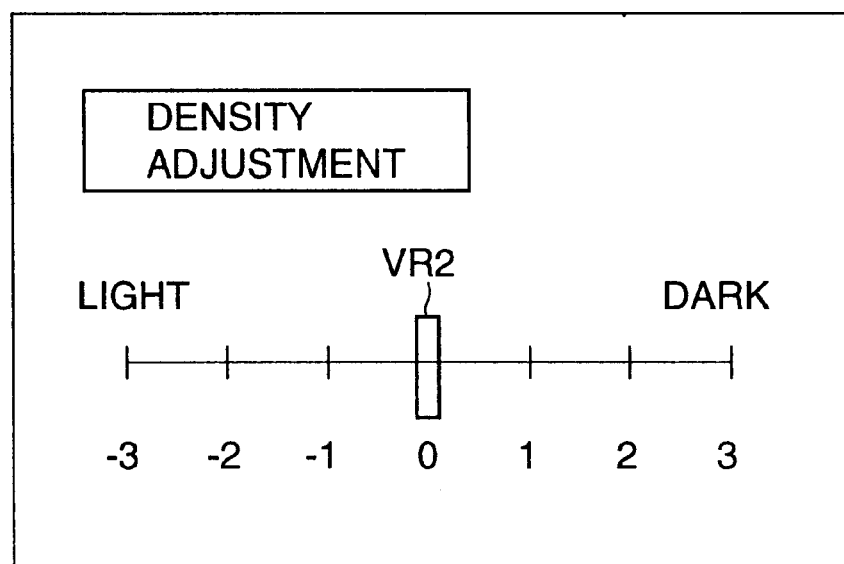
FIG. 3 is a plan view schematically showing a constitution example of a density adjustment unit as an image quality parameter input unit.

Next, the image quality parameter input unit 2 will be explained. The image quality parameter input unit 2 inputs a parameter of the image quality to be adjusted and comprises, for example, a touch panel. For example, sharpness adjustment adjusting the sharpness of an image as shown in FIG. 2 or density adjustment of an image as shown in FIG. 3 is displayed on the touch panel. When a user moves a variable resistor VR1 or VR2 to the left or right, the applicable adjustment amount is decided.

These image quality parameters are not limited to those shown in this example and there are various adjustment methods available such as not only hue adjustment and saturation adjustment but also color adjustment for adjusting the amounts of coloring materials for image recording such as C (cyan), M (magenta), Y (yellow), and K (black).

Next, the image quality parameter storage unit 3 will be explained. The image quality parameter storage unit 3 stores an image quality adjustment parameter input from the image quality parameter input unit 2. For example, in the sharpness adjustment shown in FIG. 2, up to 7 kinds of parameter values from −3 to 3 can be set and the parameter values are stored. The same may be said with the density adjustment shown in FIG. 3 and the parameter values from −3 to 3 are stored. The same may be said with the other image quality adjustments and the parameter value in each image quality adjustment is stored.

In the case of storage, the parameter value to be stored is not updated but the parameter values in the past adjustment are all stored and sequentially accumulated. The image quality parameter storage unit 3 may be of any form if it is a storage medium such as a memory or a hard disk.

Next, the image quality parameter decision unit 4 will be explained. The image quality parameter decision unit 4 decides a parameter for image processing by the image processing unit 5 on the basis of the parameters for image quality adjustment accumulated in the image quality parameter storage unit 3.

The default value of each image quality adjustment parameter of this processor is the center value (for example, 0 in the sharpness adjustment shown in FIG. 2 or the density adjustment shown in FIG. 3) in the initial state, though by the statistical analysis of accumulated parameters in the image quality parameter storage unit 3, the parameter value of the image quality to be processed is decided.

Figure 4:
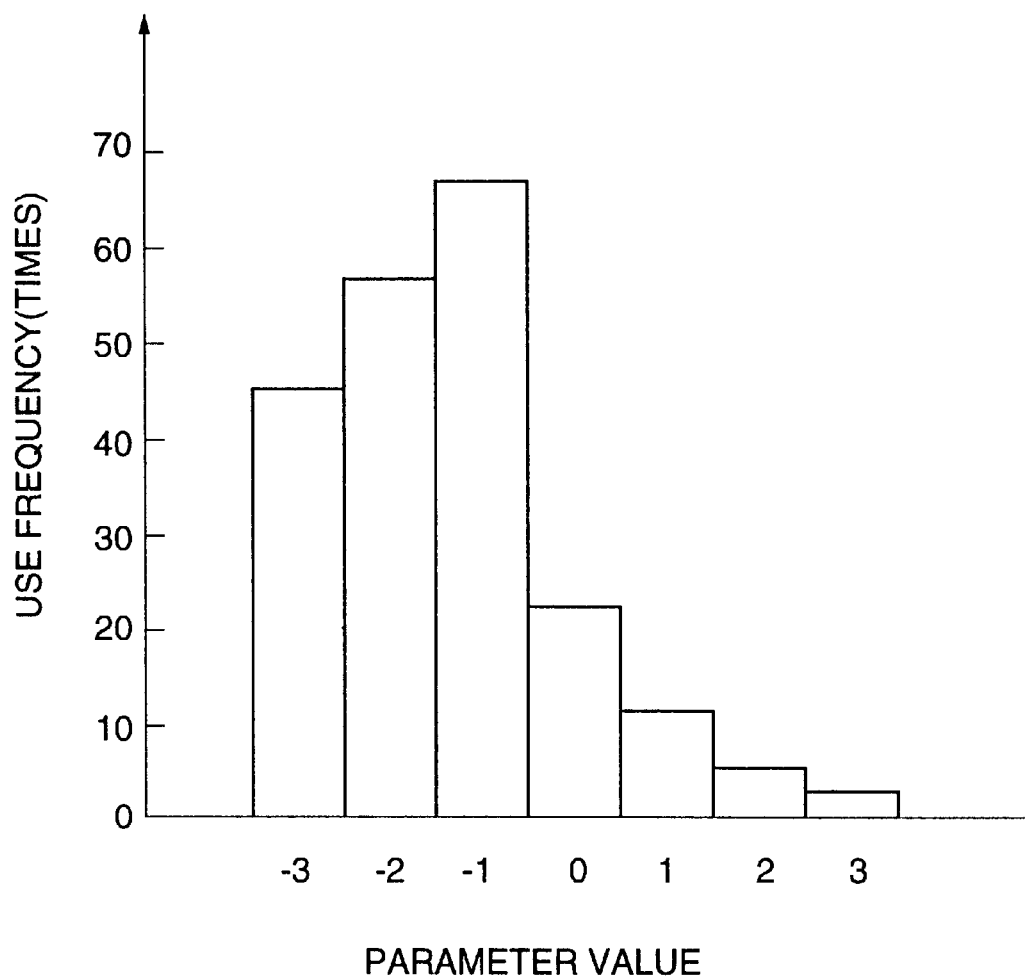
FIG. 4 is a graph showing an example of an accumulative frequency of a density adjustment parameter.

For example, when the accumulative frequency of density adjustment parameters is the frequency (each frequency of −3 to 3 is 45, 56, 68, 22, 11, 5, 3) shown in FIG. 4, the mean value of each adjustment parameter value which is weighted by frequency can be calculated as an image quality adjustment parameter value. In FIG. 4, the horizontal axis indicates a parameter value and the vertical axis indicates the use frequency of each parameter value.

In the example shown in FIG. 4, the calculated mean parameter value P is:

$$P = ((-3 \times 45) + (-2 \times 56) + (-1 \times 68) + (0 \times 22) + (1 \times 11) +$$
$$(2 \times 5) + (3 \times 3))/(45 + 56 + 68 + 22 + 11 + 5 + 3)$$
$$= -1.36$$
$$\approx -1$$

Therefore, the sharpness parameter adjustment value of the image quality parameter decision unit 4 is decided and output as "−1". The density adjustment value and other parameter adjustment values can also be calculated in the same way.

In this example, an example that the mean value of each adjustment parameter value which is weighted by frequency is calculated as an image quality adjustment parameter value is indicated. However, it can be executed by other statistical operations and it is not limited to this embodiment.

Next, the image processing unit 5 will be explained. The image processing unit 5 performs various image processes, which will be explained later in detail, on the basis of the image parameter decided by the image quality parameter decision unit 4.

Next, the image output unit 6 will be explained. The image output unit 6 is, for example, a color printer using the electrophotographic recording method. The principle of the electrophotographic recording method will be explained in brief. Firstly, the intensity of a laser beam is modulated according to an image to be recorded and this modulated light is irradiated onto a photosensitive drum. On the photosensitive surface of the photosensitive drum, a charge is generated according to the quantity of irradiated light. Therefore, when the laser beam is scanned in the axial direction of the photosensitive drum according to the scanning position of the image and the photosensitive drum is rotated and scanned at the same time, a two-dimensional charge distribution is formed on the photosensitive drum according to the image.

Next, a toner charged by the developing unit is adhered onto the photosensitive drum. In this case, a toner of an amount according to the potential is adhered and a toner image is formed. Next, the toner image on the photosensitive drum is transferred onto a paper via the transfer belt and finally the toner is melted and the image is fixed by the fixing unit. When this operation is sequentially performed for the toners of four colors of Y, M, C, and K, a full color image can be recorded on the paper.

Figure 5:
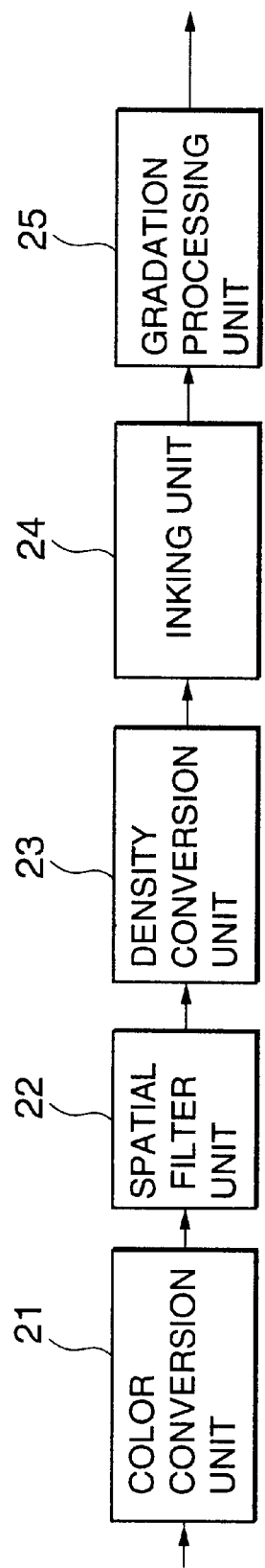
FIG. 5 is a block diagram showing a concrete constitution example of an image processing unit.

FIG. 5 shows a concrete constitution example of the image processing unit 5, which comprises, for example, a color conversion unit 21, a spatial filter unit 22, a density conversion unit 23, an inking unit 24, and a gradation processing unit 25.

The color conversion unit 21 converts each signal of R, G, and B input from the image input unit 1 by Formula 1 indicated below and obtains each signal of C (cyan), M (magenta), and Y (yellow) equivalent to the recorded signals of the image output unit 6.

Formula 1

$$Dr = -\log R$$
$$Dg = -\log G$$
$$Db = -\log B$$
$$\begin{pmatrix} C \\ M \\ Y \end{pmatrix} = \begin{pmatrix} a11 & a12 & a13 \\ a21 & a22 & a23 \\ a31 & a32 & a33 \end{pmatrix} \begin{pmatrix} Dr \\ Dg \\ Db \end{pmatrix}$$

Figure 6:
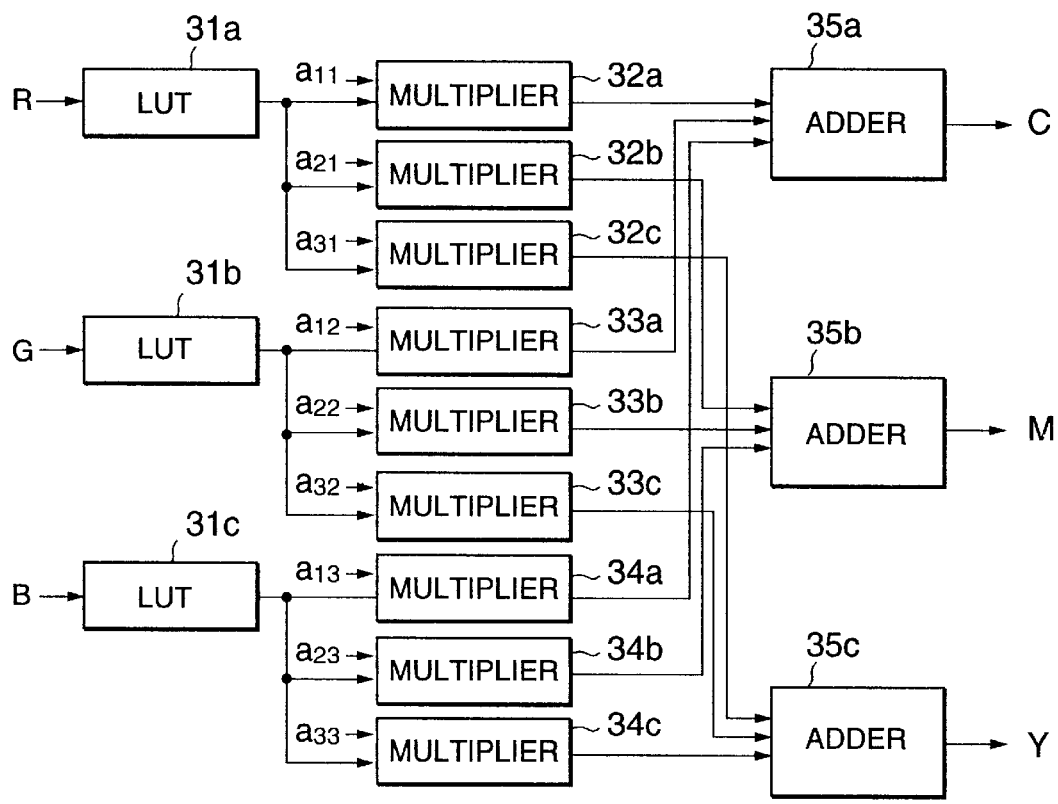
FIG. 6 is a block diagram showing a concrete constitution example of a color conversion unit.

As a concrete constitution example of the color conversion unit 21 performing such an operation, for example, the circuit shown in FIG. 6 may be cited. The log conversion comprises a lookup table and the 3×3 matrix operation comprises 9 multipliers and 3 adders.

Namely, in FIG. 6, the signals R, G, and B from the image input unit 1 are input to lookup tables 31a, 31b, and 31c for performing the log conversion respectively. The outputs of the lookup table 31a are input to multipliers 32a, 32b, and 32c respectively and multiplied by coefficients a11, a21, and a31 respectively. The outputs of the lookup table 31b are input to multipliers 33a, 33b, and 33c respectively and multiplied by coefficients a12, a22, and a32 respectively. The outputs of the lookup table 31c are input to multipliers 34a, 34b, and 34c respectively and multiplied by coefficients a13, a23, and a33 respectively.

The multiplication results of the multipliers 32a, 33a, and 34a are input to an adder 35a and added. The multiplication results of the multipliers 32b, 33b, and 34b are input to an adder 35b and added. The multiplication results of the multipliers 32c, 33c, and 34c are input to an adder 35c and added.

The addition result of the adder 35a is output as a signal C, and the addition result of the adder 35b is output as a signal M, and the addition result of the adder 35c is output as a signal Y.

Figures 7, 8:
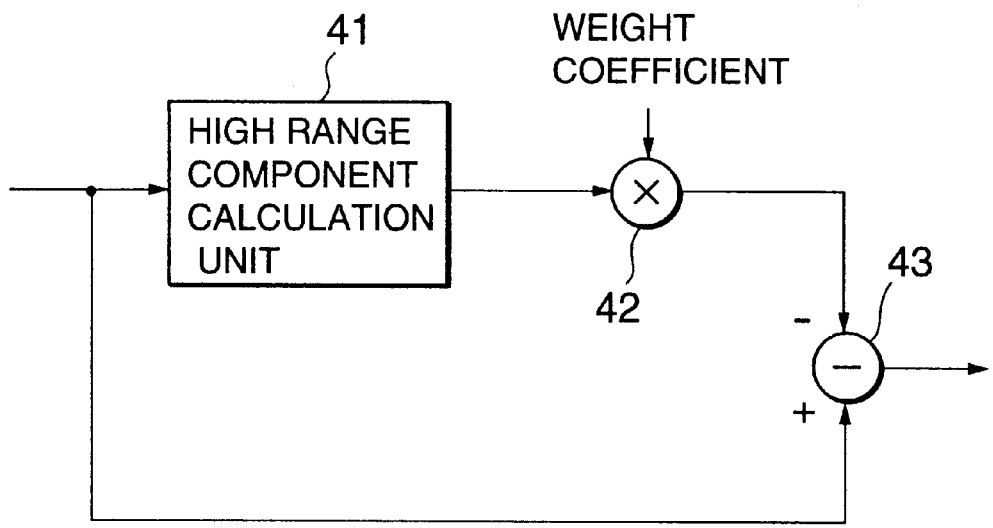
FIG. 7 is a block diagram showing a schematic constitution of a spatial filter unit.
FIG. 8 is a diagram for explaining a filter constituting the high range component calculation unit shown in FIG. 7.

The spatial filter unit 22 comprises, for example, a high range component calculation unit 41, a multiplication unit 42 for calculating the weight of the high range component, and a subtraction unit 43 for performing subtraction from the original image as shown in FIG. 7. The high range component calculation unit 41 operates, for example, a 3×3 Laplacian filter and emphasizes the high range component of the original image and it comprises the filters shown in FIG. 8.

Figure 9:
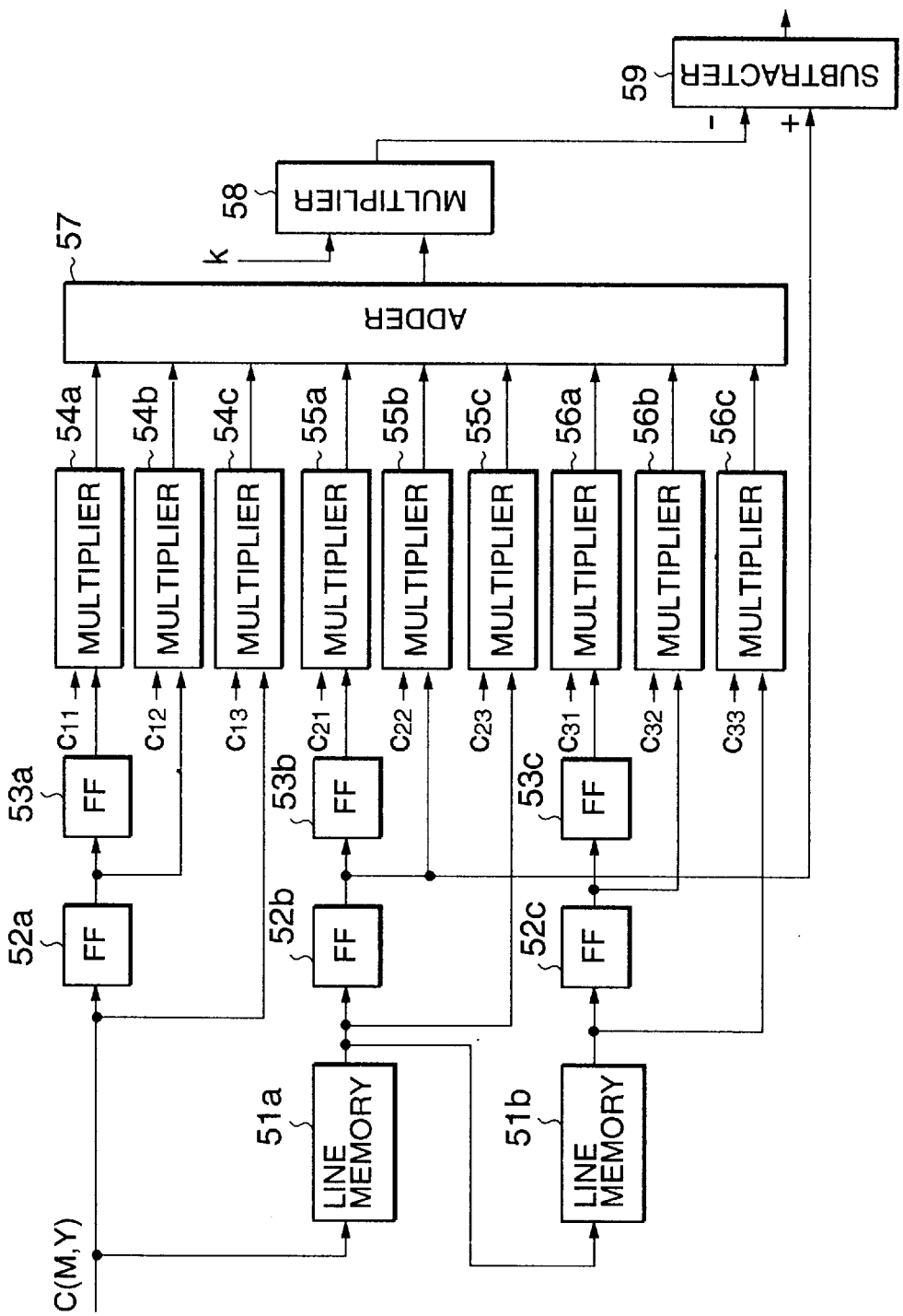
FIG. 9 is a block diagram showing a concrete constitution example of a spatial filter unit.

FIG. 9 shows a concrete constitution example of the spatial filter unit 22 and this circuit is necessary for each signal of C, M, and Y. In this case, the weighting factor k is the image parameter decided by the image quality parameter decision unit 4 and by adjusting this weighting factor k, the sharpness of an image can be adjusted.

In FIG. 9, the signal C (M or Y) output from the color conversion unit 21 is input to a line memory 51a for one-line delay and the output of the line memory 51a is further input to a line memory 51b for one-line delay.

The signal C (M or Y) from the color conversion unit 21 is input to an FF (flip-flop) circuit 52a and the output of the FF circuit 52a is input to an FF circuit 53a. The output of the line memory 51a is input to an FF circuit 52b and the output of the FF circuit 52b is input to an FF circuit 53b. The output of the line memory 51b is input to an FF circuit 52c and the output of the FF circuit 52c is input to an FF circuit 53c.

The output of the FF circuit 53a is input to a multiplier 54a, and the output of the FF circuit 52a is input to a multiplier 54b, and the signal C (M or Y) from the color conversion unit 21 is input to a multiplier 54c, and they are multiplied by coefficients c11, c12, and c13 respectively.

The output of the FF circuit 53b is input to a multiplier 55a, and the output of the FF circuit 52b is input to a multiplier 55b, and the output of the line memory 51a is input to a multiplier 55c, and they are multiplied by coefficients c21, c22, and c23 respectively.

The output of the FF circuit 53c is input to a multiplier 56a, and the output of the FF circuit 52c is input to a multiplier 56b, and the output of the line memory 51b is input to a multiplier 56c, and they are multiplied by coefficients c31, c32, and c33 respectively.

The multiplication results of the multipliers 54a, 54b, 54c, 55a, 55b, 55c, 56a, 56b, and 56c are input to an adder 57 respectively and added. The addition result of the adder 57 is input to a multiplier 58 and multiplied by the weighting factor k. The multiplication result of the multiplier 58 is input to a subtracter 59, and subtraction is performed between the multiplication result and the output of the FF circuit 52b, and the subtraction result is the output of the spatial filter unit 22.

Figure 10:
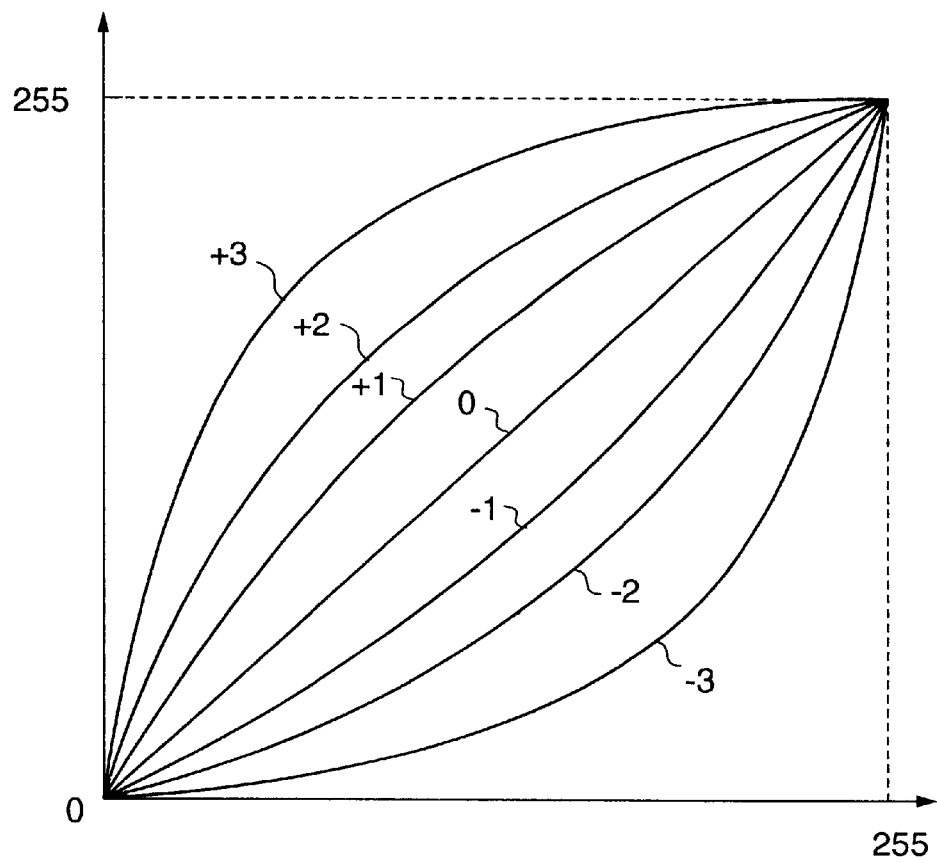
FIG. 10 is a graph showing a density conversion curve in a density conversion unit.

The density conversion unit 23 is a circuit for adjusting the density of each color of C, M, and Y and the simplest constitution thereof is a lookup table comprising 8 input bits and 8 output bits. In this table, for example, a density conversion table as shown in FIG. 10 is set. By default, a curve [0] (a curve in which the input and output are equal to each other) is set and a density curve corresponding to "−3 to +3" is selected and set according to the image quality parameter decided by the image quality parameter decision unit 4.

The inking unit 24 performs a process of generating each signal of C' (cyan), M' (magenta), Y' (yellow), and K (black)

from each signal of C' (cyan), M' (magenta), and Y' (yellow) and for example, it is performed by the well-known UCR (under color removal) process indicated by the following formulas:

$$K = a \times min(C, M, Y)$$

$$C' = C - K$$

$$M' = M - K$$

$$Y' = Y - K$$

wherein a: parameter deciding the ink amount and min: function for obtaining the minimum value.

A concrete constitution example of the inking unit 24 performing such an operation is the constitution of the circuit shown in FIG. 1.

Figure 11:
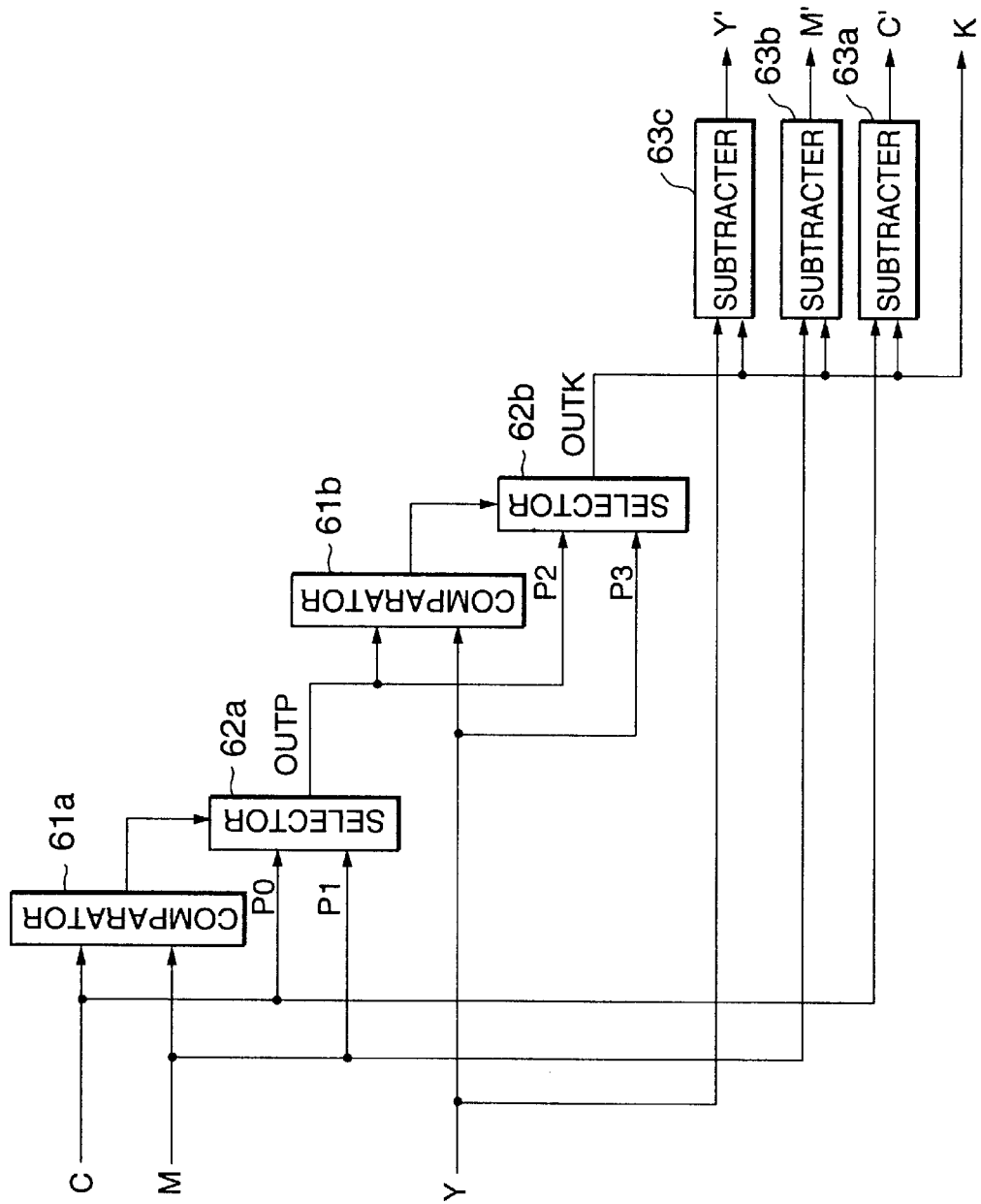
FIG. 11 is a block diagram showing a concrete constitution example of an inking unit.

In FIG. 11, the signals C and M output from the density conversion unit 23 are compared by a comparator 61a in the magnitude of their values and a signal of the result is output to a selector 62a.

To the input ports P0 and P1 of the selector 62a, the signals C and M form the density conversion unit 23 are input respectively and an input port (for example, when C is small, the input port P0) is selected and output by the control signal from the comparator 61a. This output signal OUTP is as follows:

$$OUTP = min(C, M)$$

In the same way, when the signal OUTP and the signal Y from the density conversion unit 23 are input to a comparator 61b, and the control signal of the result is input to a selector 62b, and the signal OUTP and the signal Y from the density conversion unit 23 are input to the input ports P2 and P3 of the selector 62b respectively, the output signal OUTK is as follows:

$$OUTK = min(C, M, Y)$$

and the signal K of the black component amount is obtained.

Furthermore, when the signals C and OUTK are input to a subtracter 63a and the signal OUTK is subtracted from the signal C, the signal C' is obtained. In the same way, the signal M' is obtained when the signal OUTK is subtracted from the signal M by a subtracter 63b and the signal Y' is obtained when the signal OUTK is subtracted from the signal Y by a subtracter 63c.

The gradation processing unit 25 performs a process of converting each 8-bit signal of C', M', Y', and K output from the inking unit 24 to, for example, one bit (binary) and as a typical method, there is an error diffusion method available. The error diffusion method is a method for adding the density of the notable pixel which is multiplied by the weighting factor of the binary coding error of the peripheral pixels already binary coded and binary coding it by the fixed threshold value.

Figure 12:
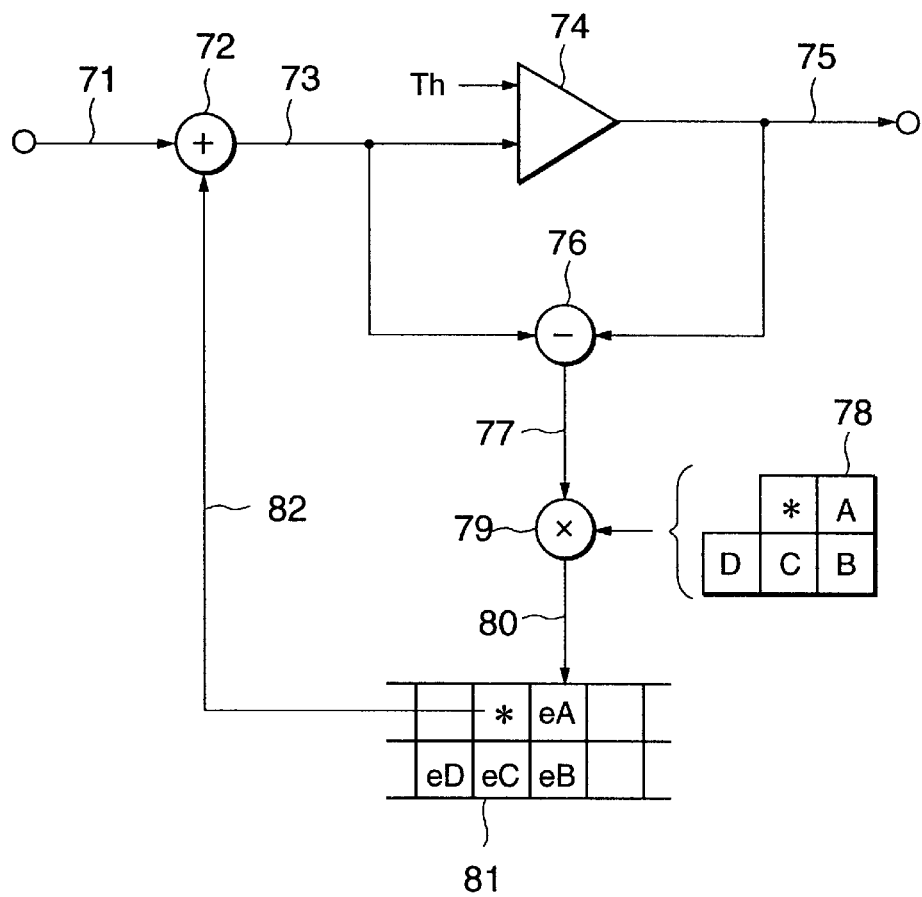
FIG. 12 is a block diagram showing a schematic constitution of a gradation processing unit.

FIG. 12 shows a schematic constitution of the gradation processing unit 25 for performing the binary coding process by the error diffusion method. In FIG. 12, a reference numeral 71 indicates an image signal to be input, 72 a correction circuit for correcting image information of a notable pixel, 73 a correction image signal, 74 a binary coding circuit for binary coding the corrected image information of the notable pixel, 75 a binary coding image signal, 76 a binary coding error calculation unit for calculating a binary coding error of the binary coded notable pixel, 77 a binary coding error signal, 78 a weighting factor storage unit for storing a weighting factor for calculating a weight error, 79 a weight error calculation unit for calculating a weight error by multiplying the binary coding error calculated by the binary coding error calculation unit 76 by the weighting factor of the weighting factor storage unit 78, 80 a weight error signal, 81 an error storage unit for storing the weight error calculated by the weight error calculation unit 79, and 82 an image correction signal.

The binary coding process by the error diffusion method will be explained hereunder in detail. For the input image signal (output signal of the inking unit 24), the correction process is performed by the image correction signal 82, which will be described later, in the correction circuit 72 and the correction image signal 73 is output. The correction image signal 73 is compared with the binary coding threshold value Th (for example, 80 h, wherein h (hex) indicates a hexadecimal number) in the binary coding circuit 74. When the correction image signal 73 is larger than the binary coding threshold value Th, "1" (black pixel) is output as the binary coding image signal 75 and when it is smaller, "0" (white pixel) is output.

The binary coding error calculation unit 76 calculates the difference between the correction image signal 73 and the binary coding image signal 75 (in this case, when the binary coding image signal 75 is "0", 0 h is set and when it is "1", ffh is set) and outputs it as the binary coding error signal 7. The weight error calculation unit 79 calculates the weight error signal 80 in which the binary coding error signal 77 is multiplied by the weighting factors A, B, C, and D (A=7/16, B=1/16, C=6/16, D=3/16) of the weighting factor storage unit 78.

In this case, the mark * in the weighting factor storage unit 78 indicates the position of a notable pixel and the binary coding error of the notable pixel is multiplied by the weighting factors A, B, C, and D and the weight errors of the peripheral pixels (pixels corresponding to the positions of the weighting factors A, B, C, and D) of the notable pixel are calculated.

The error storage unit 81 stores the weight error signal 80 calculated by the weight error calculation unit 79 and the weight errors of four pixels calculated by the weight error calculation unit 79 are added to the areas eA, eB, eC, and eD respectively for the mark * of the notable pixel and stored. The aforementioned image correction signal 82 is a signal of the position of the mark * and it is a signal of the accumulated weight errors of the four pixels in total calculated by the aforementioned procedure.

The aforementioned is a constitution example of the image processing unit 5 and each signal of C', M', Y', and K processed as mentioned above is input to the image output unit 6 and recorded and output on a paper.

In the first embodiment explained above, the processing parameters of the image processing unit 5 are decided on the basis of the stored image quality parameters. However, the following method is also available. Namely, when this image processor is to be periodically maintained, a customer engineer periodically checks the stored image quality parameters and an optimum parameter of the image processing unit 5 is decided on the basis of the stored parameters.

The image processor has a function for setting parameters of the image processing unit 5 as a maintenance mode and a customer engineer sets parameters in the maintenance mode. By doing this, there is no need to have a function for automatically calculating an optimum parameter on the basis of the stored parameters and updating the parameters in the image processor and the cost of the processor can be reduced. Since the customer engineer sets parameters, the optimum parameter calculation method can be properly changed and a flexible system can be obtained.

It is also possible to store the characteristic amount of an image instead of an input image quality parameter, periodically analyze the characteristic amount by the customer engineer, and set an image processing parameter.

Next, the second embodiment will be explained.

In the aforementioned first embodiment, an example that a parameter for processing an image is decided on the basis of an image quality adjustment parameter input by a user is explained. However, it is also effective to decide a parameter on the basis of the input image quality parameter and the characteristic amount of a document image and the second embodiment is an example in that case.

Figure 13:
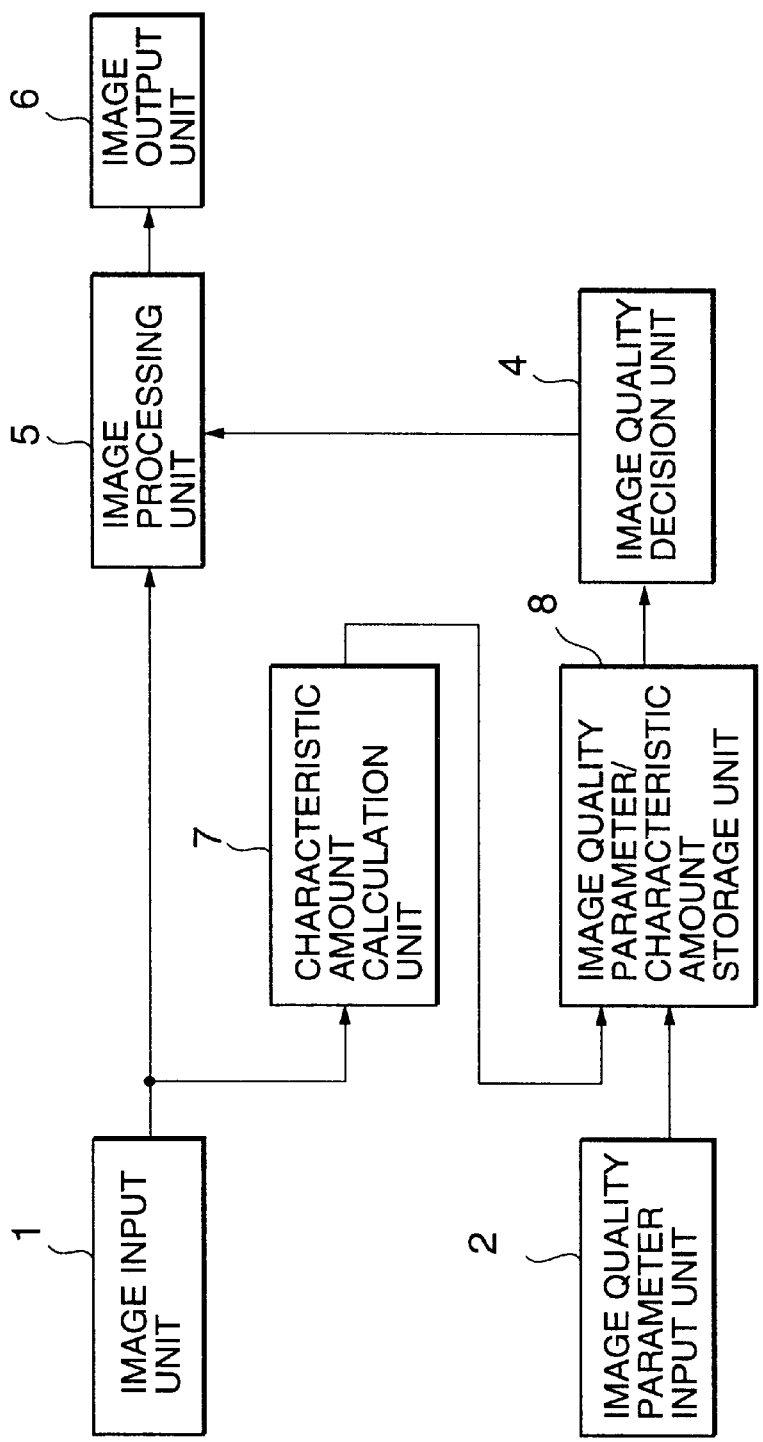
FIG. 13 is a block diagram schematically showing the constitution of a digital color/monochromatic copying machine of the second embodiment of the present invention.

FIG. 13 schematically shows the constitution of a digital color/monochromatic copying machine as an example of the image processor of the second embodiment. The second embodiment adds a characteristic amount calculation unit 7 to the first embodiment mentioned above as a characteristic amount calculation means and uses an image quality parameter and characteristic amount storage unit 8 in place of the image quality parameter storage unit 3 at the same time and has the same constitution as that of the first embodiment shown in FIG. 1 for the other portions. Therefore, the same numeral is assigned to each of the same portions as those of the first embodiment, and the explanation is omitted or simplified, and the different portions are explained in detail.

The characteristic amount calculation unit 7 calculates the characteristic amount of an image from each signal of R, G, and B input by an image input unit 1. As characteristic amounts of an image, various characteristic amounts such as a color density histogram of an input image, differential histogram, and spatial frequency distribution can be considered. However, these amounts are all characteristic amounts indicating the kind of a document image. An example of histogram information calculation for calculating the color distribution of a document will be explained hereunder.

Figure 14:
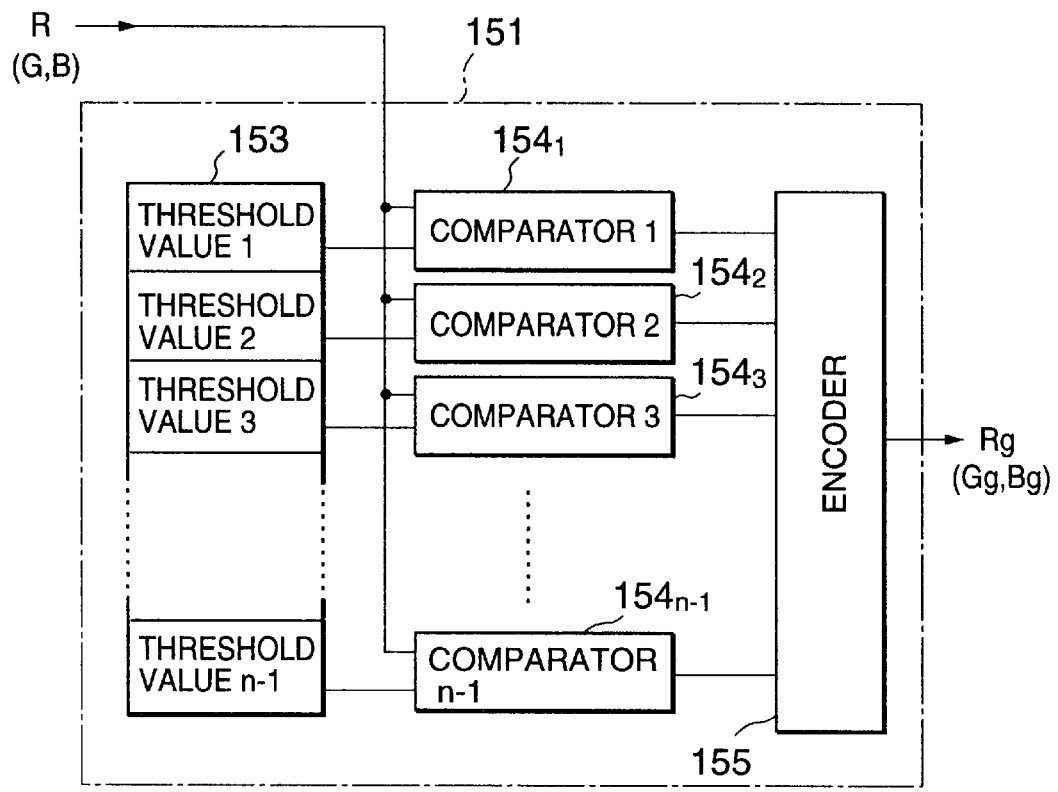
FIG. 14 is a block diagram showing the constitution of a multi-level converter constituting a characteristic amount calculation unit.
Figure 15:
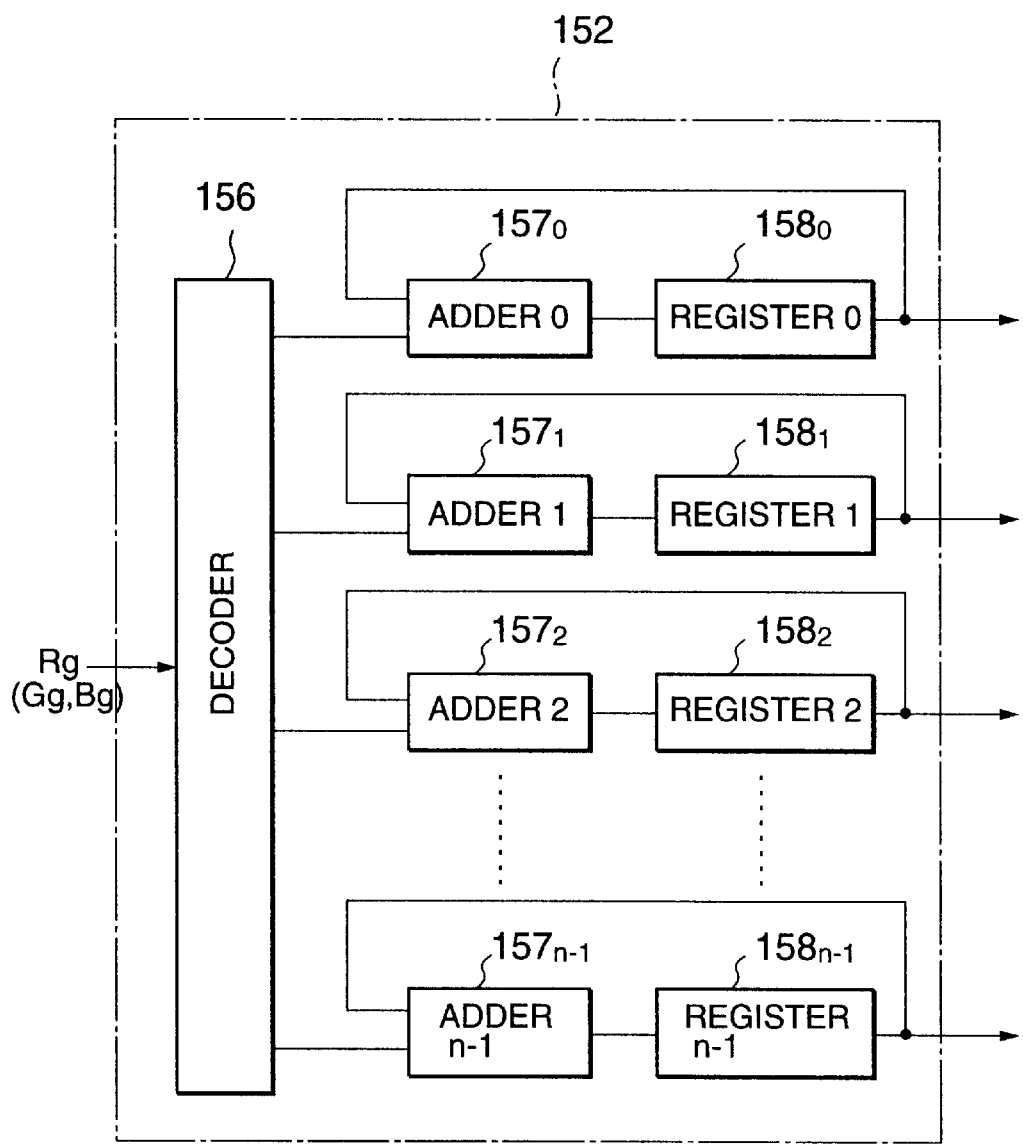
FIG. 15 is a block diagram showing the constitution of a histogram creation unit constituting a characteristic amount calculation unit.

The characteristic amount calculation unit 7 has a histogram extraction means comprising a multi-level converter 151 as shown in FIG. 14 and a histogram creation unit 152 as shown in FIG. 15.

The multi-level converter 151 performs the multi-leveling process by comparing the input signals R, G, and B with the predetermined threshold values Th1 to Thin-1 and outputs the multi-level image signals Rg, Gg, and Bg. As shown in FIG. 14, the multi-level converter 151 comprises a threshold value memory 153 for storing n-1 threshold values Th1 to Thn-1 respectively, n-1 comparators 1541 to 154n-1 for comparing the signal R (G or B) to be input with the threshold values Th1 to Thn-1 in the threshold value memory 153 respectively, and an encoder 155 for coding each comparison result of the comparators 1541 to 154n-1 and outputting the multi-level image signal Rg (Gg, Bg).

In FIG. 14, only the circuit for the signal R is shown. However, actually, the same circuit is provided also for the signals G and B and it is omitted in the drawing.

Next, assuming the number of multi-levels as n, the operation of the multi-level converter 151 will be explained. By comparing the input signal R with the threshold values Th1 to Thn-1 in the threshold value memory 153 respectively by the comparators 1541 to 154n-1, the multi-level converter 151 performs the multi-leveling process and outputs the multi-level image signal Rg. Namely, when the input signal R is smaller than the threshold value Th1, the multi-level converter 151 outputs "0" as the multi-level image signal Rg and when it is larger, the multi-level converter 151 compares it with Th2 and when it is smaller than Th2, the multi-level converter 151 outputs "1". Then, when the input signal R is larger than the threshold value Th2 and smaller than the threshold value Th3, the multi-level converter 151 outputs "2" and in this way, the multi-level converter 151 sequentially compares the input signal R up to the threshold value Tn-1. This comparison process is indicated by the following formulas:

$Rg=0: R<Th1$ $Rg=1: R \geq Th1$ and $R<Th2$ $Rg=2: R \geq Th2$ and $R<Th3$ $Rg=3: R \geq Th3$ and $R<Th4$ $Rg=n-2: R \geq Thn-1$ and $R<Thn$ $Rg=n-1: R \geq Thn$ With respect to the signals G and B, in the same way as with the signal R explained above, they are operated and the multi-level image signals Gg and Bg are calculated.

The histogram creation unit 152 creates histogram information on the basis of the multi-level image signals Rg, G, and Bg output from the multi-level converter 151 and it comprises, as shown in FIG. 15, a decoder 156 for decoding the multi-level image signal Rg (Gg or Bg) to be input, n adders $157_0$, $157_1 \sim 157_{n-1}$, and n registers $158_0$, $158_1 \sim 158_{n-1}$.

In FIG. 15, only the circuit for the multi-level image signal Rg is shown. However, actually, the same circuit is provided also for the multi-level image signals Gg and Bg and it is omitted in the drawing.

Next, the operation of the histogram creation unit 152 will be explained. The registers $158_0$, $158_1$, - - - , and $158_{n-1}$ require 25 bits, for example, when an image of A3 size and 400 dpi is to be input. Each of the registers $158_0$, $158_1$, - - - , and $158_{n-1}$ is cleared to "0" beforehand and when the multi-level image signal Rg is "0", the register $158_0$ is count by 1. When the multi-level image signal Rg is "1", the register $158_1$ is count up and when the multi-level image signal Rg is "2", the register $158_2$ is count up. These processes are performed independently for the multi-level image signal Rg, G, and Bg and as a result, histogram information is created in the registers $158_0$, $158_1$, - - - , and $158_{n-1}$.

The aforementioned process is sequentially repeated for each pixel to be input until an image on one page is fully input. The frequency (histogram information) of image information accumulated in the registers $158_0$ (high density portion) to $158_{n-1}$ (low density portion) will be explained hereunder as RH (0), RH (1), - - - , and RH (n-1) for the signal R, GH (0), GH (1), - - - , GH (n-1) for the signal G, and BH (0), BH (1), - - - , and BH (n-1) for the signal B.

Figure 16:
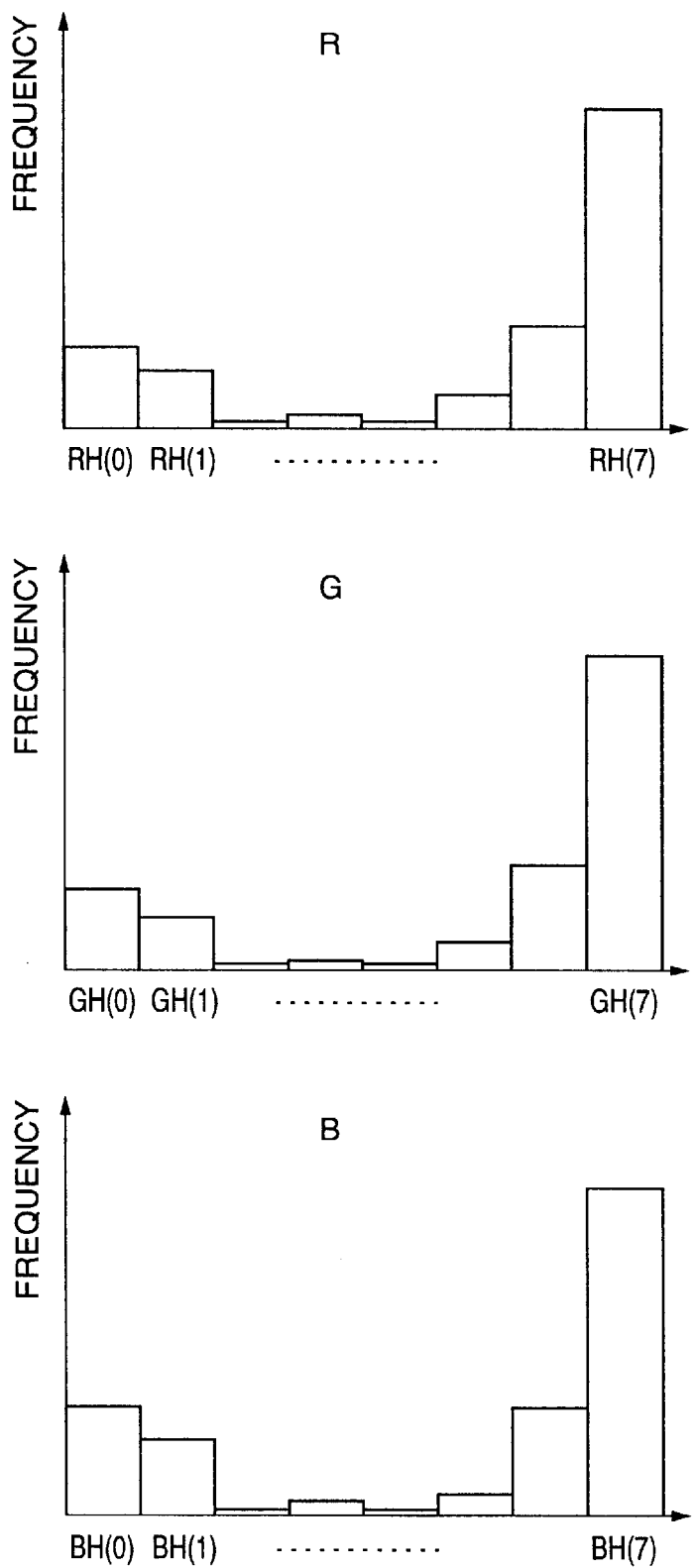
FIG. 16 is a drawing showing an example of created histogram information.

The histogram creation unit 152 creates histogram information as shown in FIG. 16. FIG. 16 shows a typical example (n=8) of a monochromatic document and RH, GH, and BH show almost equal frequencies and have high frequencies in the high density portion and the low density portion.

Extraction of the color characteristic is originally to be obtained on the basis of the respective values of R, G, and B (that is, not independently of R, G, and B) and a large number of registers are required as shown by the following formulas.

$g=0: R<th1$ and $G<th1$ and $B<th1$ $g=1: R \geq Th1$ and $R<Th2$ and $G<th1$ and $B<th1$ $g=n: R<Th1$ and $G \geq Th1$ and $G<Th2$ and $B<Th2$ $g=n^3-1: R \geq Thn-1$ and $G \geq Thn-1$ and $B \geq Thn-1$ Namely, n3 registers are required.

As explained above, the characteristic amount calculation unit 7 calculates the characteristic amount of an image. In FIG. 16, by the shape of each of the respective density histograms of the signals R, G, and B obtained by the characteristic amount calculation unit 7, the kind of a document image can be discriminated. For example, in each histogram shown in FIG. 16, when a document with letters written on a white base is used, it can be judged from the shape of the histogram. When a picture document is used, a histogram shape having no clear peak is obtained.

The image quality parameter and characteristic amount storage unit 8 stores a parameter input to the image quality parameter input unit 2 and a characteristic amount calculated by the characteristic amount calculation unit 7. The image quality parameter decision unit 4 decides a parameter of the image processing to be performed by the image processing unit 5 on the basis of the parameters stored in the image quality parameter and characteristic amount storage unit 8.

As mentioned above, a parameter of the image processing to be performed by the image processing unit 5 and the copying operation is performed.

Next, the third embodiment will be explained.

Figure 17:
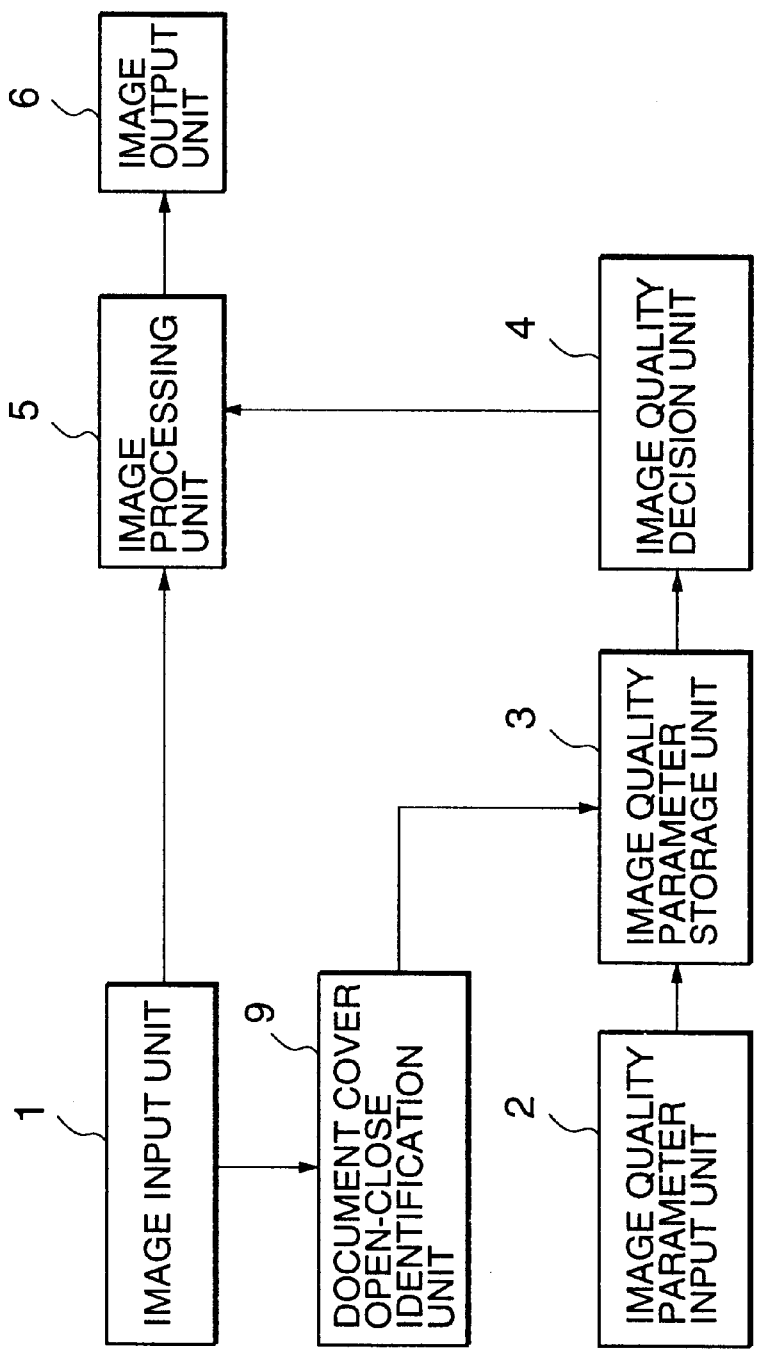
FIG. 17 is a block diagram schematically showing the constitution of a digital color/monochromatic copying machine of the third embodiment of the present invention.

FIG. 17 schematically shows the constitution of a digital color/monochromatic copying machine as an example of the image processor of the third embodiment. The third embodiment adds a document cover open-close identification unit 9 as a document setting detection means to the first embodiment mentioned above and has the same constitution as that of the first embodiment shown in FIG. 1 for the other portions. Therefore, the same numeral is assigned to each of the same portions as those of the first embodiment, and the explanation is omitted or simplified, and the different portions are explained in detail.

The document cover open-close identification unit 9 discriminates (detects) opening or closing of the document cover on the document stand provided in the image input unit 1 and when a user opens the document cover on the document stand so as to set a document on the document stand, it discriminates (detects) it and sends an identification signal therefor to the image quality parameter storage unit 3. When the image quality parameter storage unit 3 receives the document cover open identification signal from the document cover open-close identification unit 9, it receives and stores the parameter which is input to the image quality parameter input unit 2 immediately before.

As mentioned above, it is also effective that the document cover open-close identification unit 9 is provided, and a user adjusts the parameters, and then only the parameter which is input immediately before the document cover is opened so as to set a document is stored in the image quality parameter storage unit 3.

Namely, there are many cases that the image quality adjustment is generally repeated until a user is convinced and it may be considered that it will adversely affect decision of an optimum image quality parameter that all the image quality adjustment parameters are used so as to decide an image quality parameter. Therefore, it is effective to store only the last one adjustment value.

In the aforementioned explanation, an image quality parameter is decided whenever the copying operation is performed. However, when these decision processes require a lot of time and when the parameter is not to be changed on the spot, it is possible to perform the operation necessary to decide an image quality parameter during the free time not accompanied by the copying operation and set the decided parameter as a default value of this processor.

In this case, it is also possible to decide an image quality parameter whenever the image quality adjustment is performed or to perform the image quality parameter decision process every a fixed period of time, change the default value, or furthermore calculate and set the default parameter of this processor on the basis of the information already stored in the image quality storage unit 3 (or the image quality parameter and characteristic amount storage unit 8) when the processor is started.

In the above description, only that an image quality adjustment parameter is input from the image quality parameter input unit 2 and this input parameter is stored in the image quality parameter storage unit 3 is explained. However, by also inputting user identification information for discriminating a user of this processor at the time of parameter input and storing the input parameter (and calculated characteristic amount) in the image quality parameter storage unit 3 every this input user identification information, an image quality parameter can be decided every user identification information (user).

Figure 18:
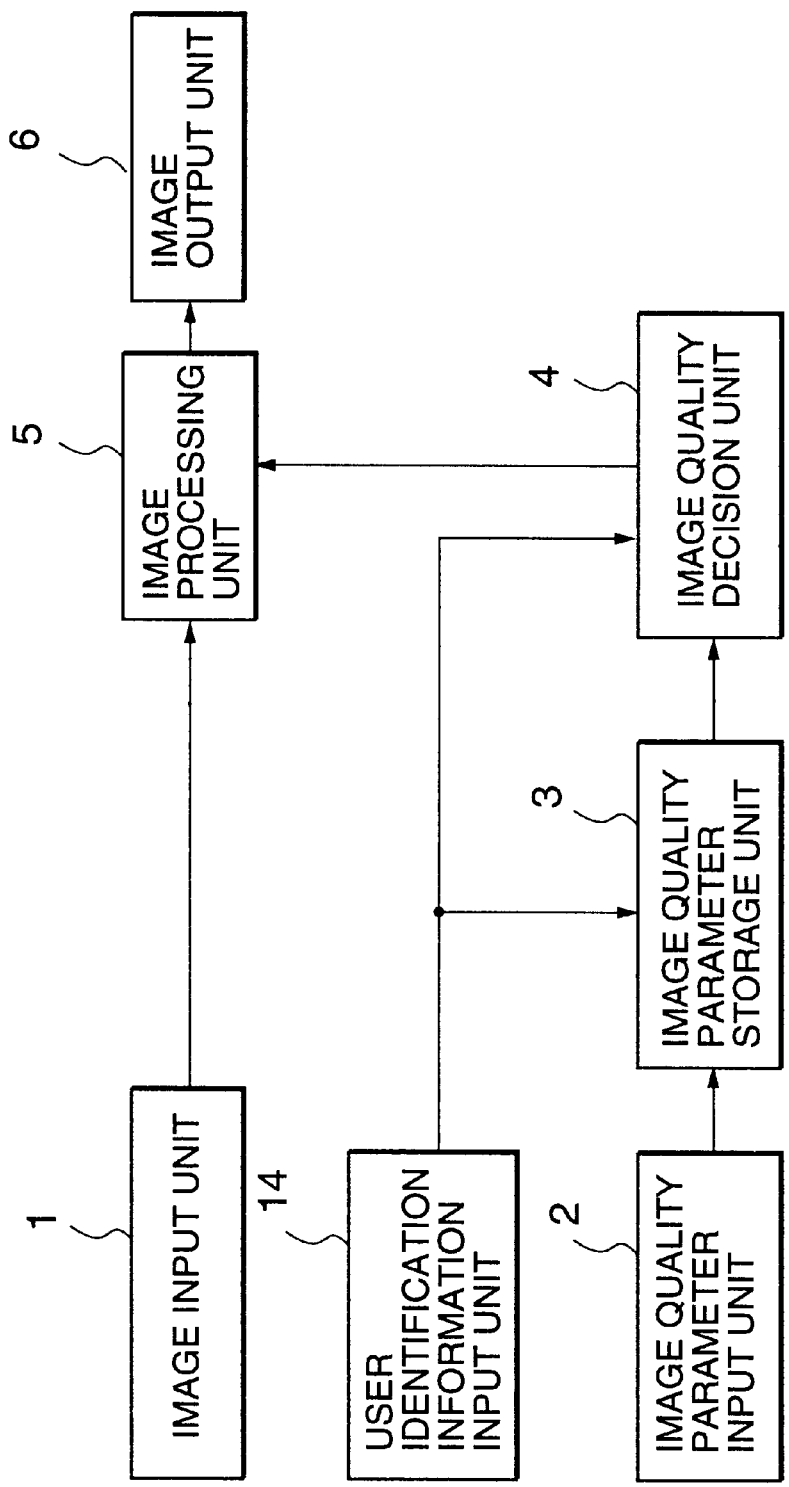
FIG. 18 is a block diagram schematically showing the constitution of a digital color/monochromatic copying machine of the fourth embodiment of the present invention.

FIG. 18 schematically shows the constitution of a digital color/monochromatic copying machine as an example of the image processor of the fourth embodiment which corresponds to such a case. The fourth embodiment adds a user identification information input unit 14 to the first embodiment mentioned above so as to control the parameters on the basis of the user identification information and has the same constitution as that of the first embodiment shown in FIG. 1 for the other portions. Therefore, the same numeral is assigned to each of the same portions as those of the first embodiment, and the explanation is omitted, and the different portions are explained in detail.

At the same time with parameter input by the image quality parameter input unit 2, a user input user identification information (for example, ID information) from the user identification information input unit 14. This input user identification information is stored in the image quality parameter storage unit 3 in correspondence with the parameter input by the image quality parameter input unit 2.

In the embodiments explained above, the image quality parameter decision unit 4 decides parameters uniformly for each processor independently of a user. However, in this embodiment, the image quality parameter decision unit 4 calculates an optimum parameter for each user on the basis of the user identification information.

The user identification information input unit 14 uses the control panel of this processor, displays, for example, an input screen as shown in FIG. 20 on the control panel, and prompts a user input and the user inputs his own user identification information in alphanumeric characters.

By use of such a constitution, each user can output an optimum image quality.

In the above explanation, the parameters input by the image quality parameter input unit 2 are color adjustment such as sharpness, density, saturation, and hue. However, the processes of inputting information of the document modes (letter mode, picture mode, map mode, etc.) synthetically controlling the image quality parameters, deciding image quality adjustment parameters on the basis of this information, and changing the default value for the input document mode are also available.

Figure 19:
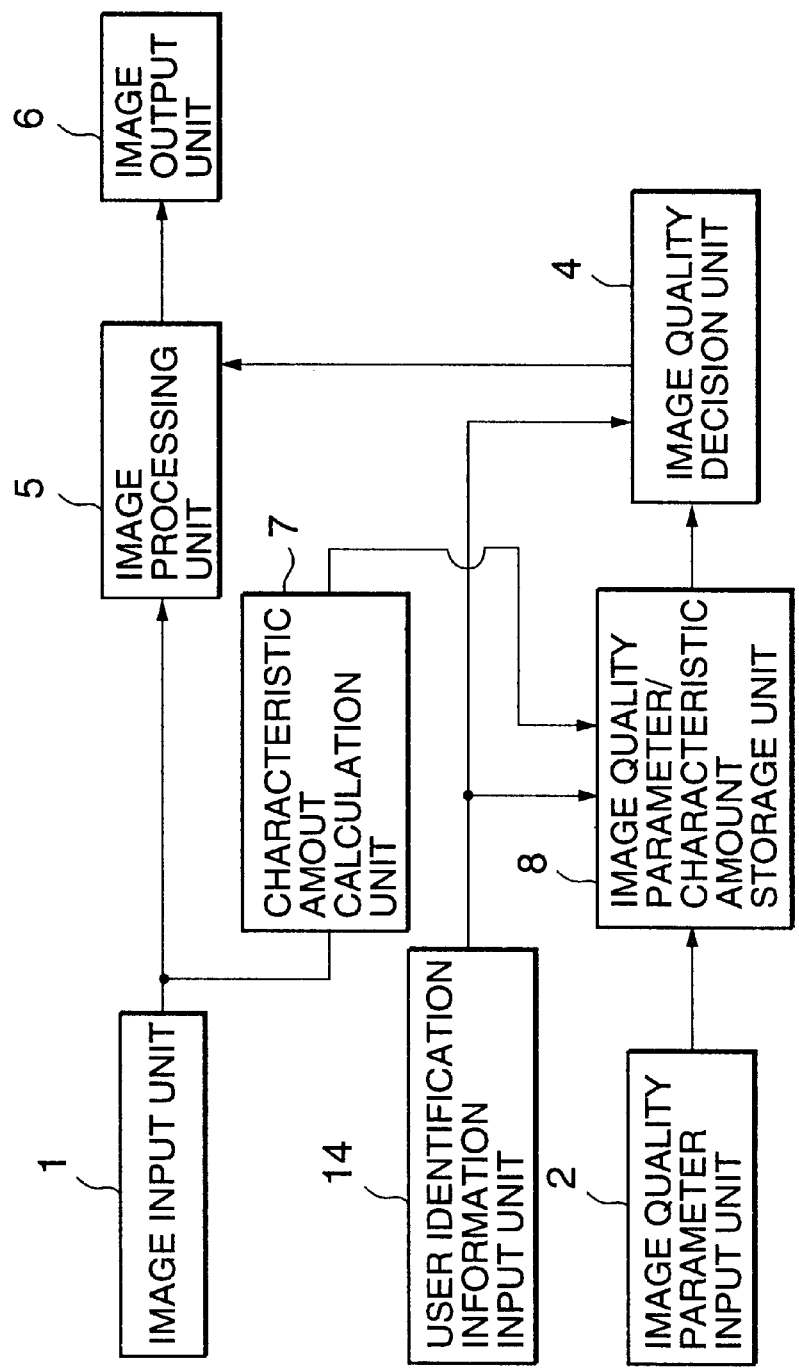
FIG. 19 is a block diagram schematically showing the constitution of a digital color/monochromatic copying machine of the fifth embodiment of the present invention.

FIG. 19 schematically shows the constitution of a digital color/monochromatic copying machine as an example of the image processor of the fifth embodiment.

The fifth embodiment adds the characteristic amount calculation unit 7 as a characteristic amount calculation means to the fourth embodiment mentioned above and uses the image quality parameter and characteristic amount storage unit 8 in place of the image quality parameter storage unit 3 and has the same constitution as that of the fourth embodiment shown in FIG. 18 for the other portions. The characteristic amount calculation unit 7 and the image quality parameter and characteristic amount storage unit 8 are explained in the second embodiment shown in FIG. 13. Therefore, the explanation thereof will be omitted here.

There is no need always to decide the image quality parameters within the processor and it is also effective to send the characteristic amount of an image and the image quality parameters input by a user via a line such a network, control the characteristic amount and image quality parameters of an image by this processor and a remote server, calculate the image processing parameters by the server, and set the image quality parameters of this processor via a line such as a network.

Figure 21:
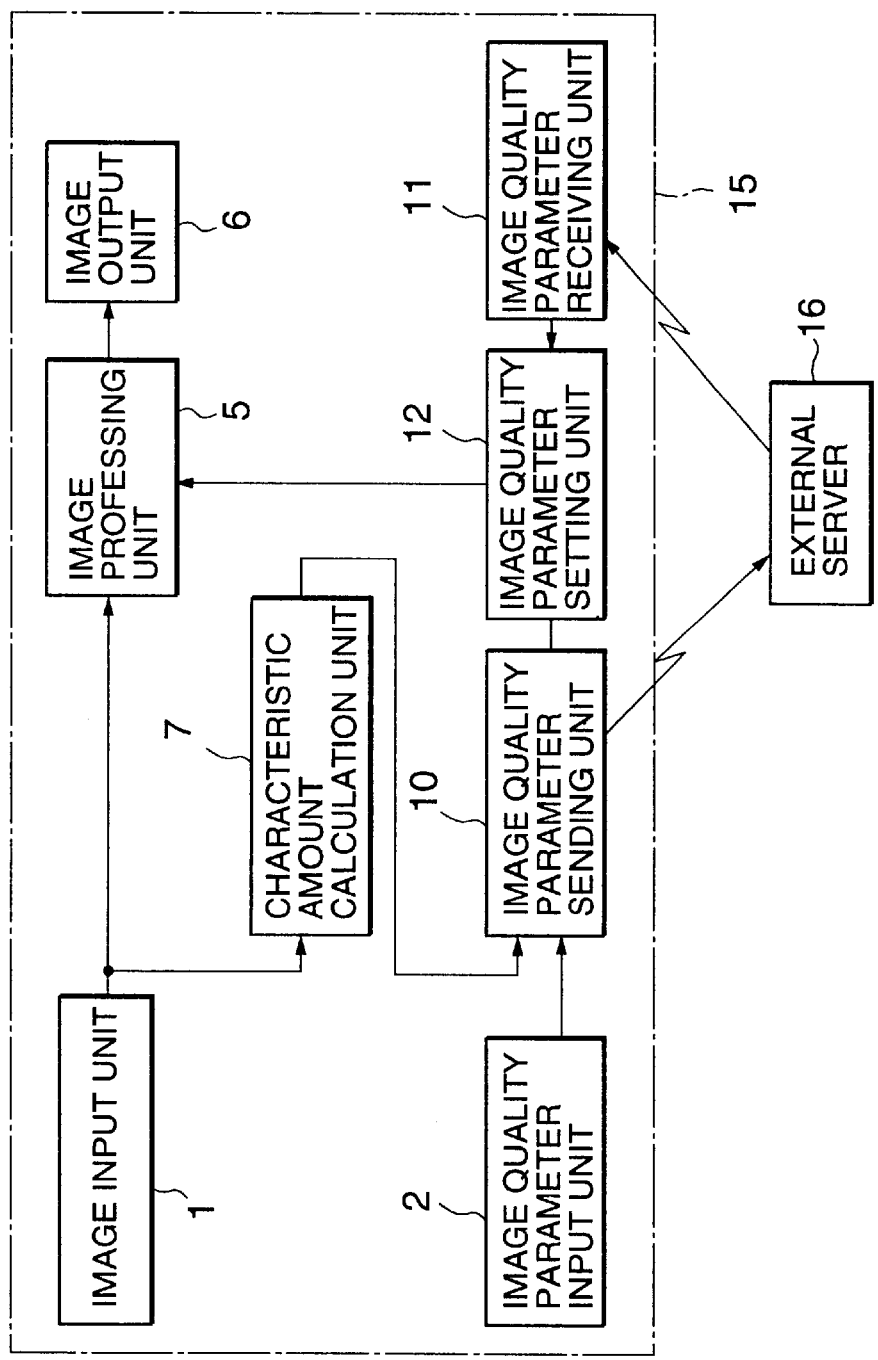
FIG. 21 is a block diagram schematically showing the constitution of an image processing system of the sixth embodiment of the present invention.

FIG. 21 schematically shows the constitution of the image processing system of the sixth embodiment corresponding to such a case. This image processing system comprises a digital color/monochromatic copying machine 15 as an image processor and a server 16 as a parameter control (allotment) device for controlling (allotting) the parameters for this copying machine 15.

The copying machine 15 comprises an image input unit 1, an image quality parameter input unit 2, an image quality parameter sending unit 10 as a sending means, an image quality parameters receiving unit 11 as a receiving means, an image quality parameter setting unit 12 as a parameter setting means, an image processing unit 5, an image output unit 6, and a characteristic amount calculation unit 7.

The image input unit 1, the image quality parameter input unit 2, the image processing unit 5, and the image output unit 6 are the same as those of the copying machine shown in FIG. 1 and the characteristic amount calculation unit 7 is the same as the copying machine shown in FIG. 13. Therefore, the explanation thereof will be omitted and the image quality parameter sending unit 10, the image quality parameter receiving unit 11, and the image quality parameter setting unit 12 which are different from those of the copying machines shown in FIGS. 1 and 13 will be explained in detail.

The image quality parameter sending unit 10 sends parameters input by the image quality parameter input unit 2 and the characteristic amount calculated by the characteristic amount calculation unit 7 to the external server 16 via a line such as a network.

The server 16 receives the characteristic amount and image quality parameters sent from the copying machine 15, controls the received image characteristic amount and image quality parameters, calculates the image quality parameters of image processing, and sends them to the copying machine 15 via a line such as a network.

The image quality parameter receiving unit 11 of the copying machine 15 receives the image quality parameters sent from the server 16 and sends them to the image quality parameter setting unit 12. The image quality parameter setting unit 12 sets the received image quality parameters in the image processing unit 5.

Also in this case, by inputting user identification information for discriminating a user of the copying machine 15 and device identification information for discriminating the copying machine 15 at the time of parameter input and sending the input parameters and calculated characteristic amount to the server 16 every the input user identification information and device identification information, the server 16 can control and calculate the image quality parameters for each user identification information (user) and for each device identification information (copying machine).

As mentioned above, by controlling various parameters by the server, applying the image processing parameter decision method corresponding to various cases, sending and setting parameters in the copying machine, or statistically analyzing the image characteristic amount and image quality parameters, optimum services can be given to each customer.

As explained above, according to the aforementioned embodiments, when a user uses the image quality adjustment function, the user's desired image quality parameters are statistically calculated, and when image quality parameters are automatically selected and set and when the user uses this processor more and more, the image quality parameters matching with the user's desire are automatically decided, and the user is not forced to perform the complicated image quality adjustment operation, and useless consumption of expendables such as papers and toners is eliminated, and the copying cost can be reduced. Furthermore, image quality adjustment parameters can be decided for each user and for each copying machine.

Furthermore, if the image quality adjustment parameters when the user adjusts the image quality, the characteristic amount of a document, the document mode selected by the user, and the user identification information can be controlled by a remote parameter control server, an optimum image quality parameter decision algorithm can be applied for each objective copying machine and services best suited to the user's needs can be given.

Figure 22:
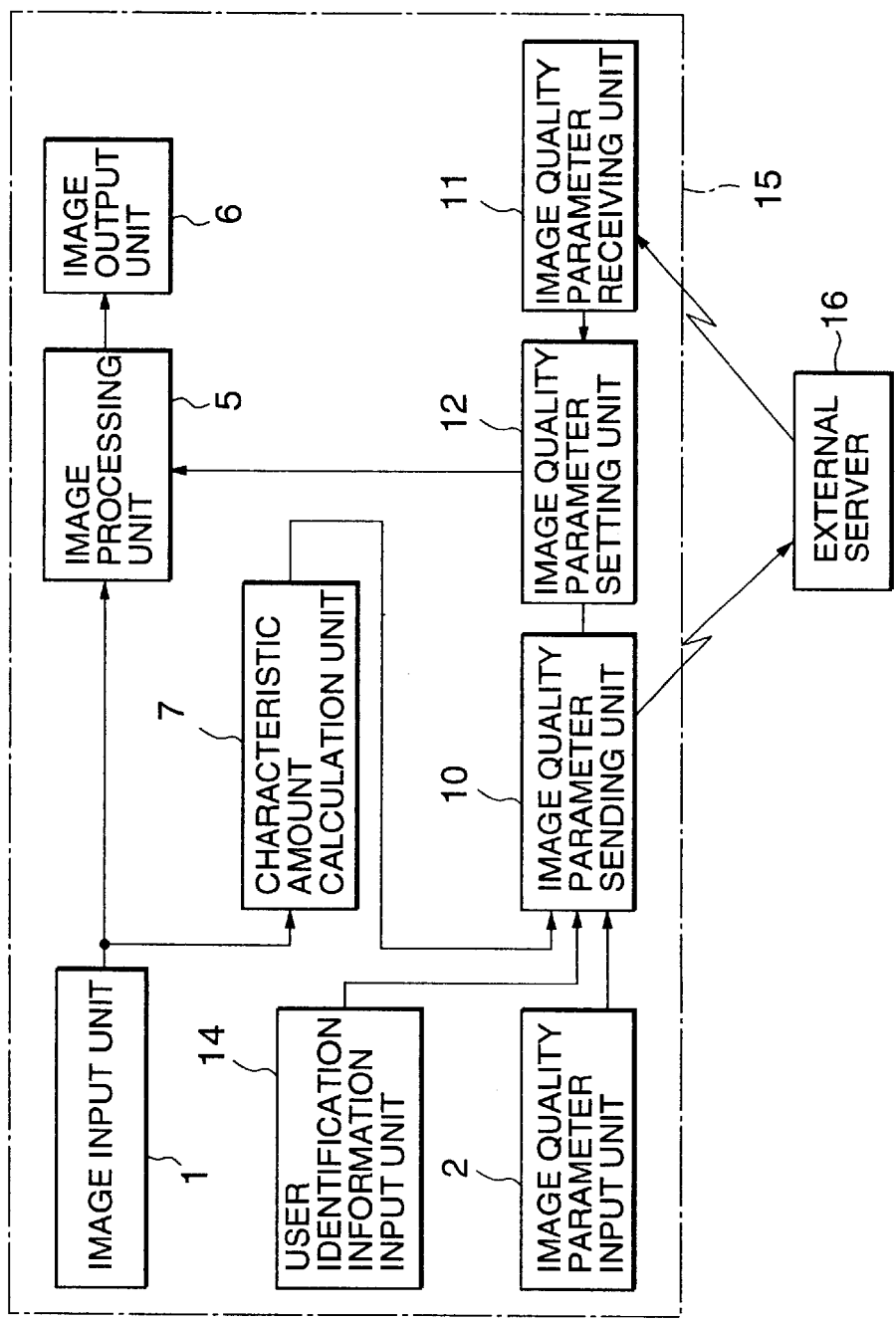
FIG. 22 is a block diagram schematically showing the constitution of an image processing system of the seventh embodiment of the present invention.

FIG. 22 schematically shows the constitution of the image processing system of the seventh embodiment. The seventh embodiment adds the user identification information input unit 14 to the sixth embodiment mentioned above and has the same constitution as that of the sixth embodiment shown in FIG. 21 for the other portions. The user identification information input unit 14 is explained in the fourth embodiment shown in FIGS. 18 and 20. Therefore, the explanation thereof will be omitted here.

In the above-mentioned embodiments of the present invention, although a digital color/monochromatic copying machine was explained, the present invention is applied also to a monochromatic copying machine, without limiting to a color copying machine.

As described in detail above, according to the present invention, an image processor and an image processing system for automatically learning the user's desired image quality and outputting an image reflected by it can be provided.

What is claimed is:

1. An image processor comprising:

image input means for reading and inputting an image of a document;

parameter input means for inputting a parameter for image quality adjustment;

parameter storage means for storing said parameter input by said parameter input means;

parameter decision means for deciding an image quality parameter for adjusting the quality of said image input by said image input means on the basis of said parameter stored in said parameter storage means;

image processing means for processing said image input by said image input means on the basis of said image quality parameter decided by said parameter decision means; and image output means for outputting said image processed by said image processing means, wherein said parameter decision means decides the mean value of each image quality parameter stored in said parameter storage means which is weighted by frequency as an image quality parameter value for image processing by said image processing means.

2. An image processor comprising:

image input means for reading and inputting an image of a document;

parameter input means for inputting a parameter for image quality adjustment;

parameter storage means for storing said parameter input by said parameter input means;

parameter decision means for deciding an image quality parameter for adjusting the quality of said image input by said image input means on the basis of said parameter stored in said parameter storage means;

image processing means for processing said image input by said image input means on the basis of said image quality parameter decided by said parameter decision means, said image processing means including:

color conversion means for converting signals R (red), G (green), and B (blue) input from said image input means to signals C (cyan), M (magenta), and Y (yellow) equivalent to recording signals of said image output means;

spatial filter means for weighting said signals C, M, and Y;

density conversion means for adjusting the density of said signals C, M, and Y weighted by said spatial filter means;

inking means for performing the UCR (under color removal) process for said signals C, M, and Y whose density is adjusted and generating signals C' (cyan), M' (magenta), Y' (yellow) and K (black); and gradation process means for converting said signals C', M', Y', and K generated by said inking means into binary values using the error diffusion method; and image output means for outputting said image processed by said image processing means.

3. An image processor comprising:

image input means for reading and inputting an image of a document;

characteristic amount calculation means for calculating the characteristic amount from said image input from said image input means, said characteristic amount calculation means including:

multi-level means for performing the multi-leveling process by comparing signals R (red), G (green), and B (blue) input by said image input means with a predetermined threshold value and outputting multi-level image signals Rg, Gg, and Bg; and histogram creation means for creating histogram information on the basis of said multi-level image signals Rg, G, and Bg input from said multi-leveling means;

characteristic amount storage means for storing said characteristic amount calculated by said characteristic amount calculation means;

parameter decision means for deciding an image quality parameter for adjusting the quality of said image input by said image input means on the basis of said characteristic amount stored by said characteristic amount storage means;

image processing means for processing said image input by said image input means on the basis of said image quality parameter decided by said parameter decision means; and image output means for outputting said image processed by said image processing means.

4. An image processor comprising:

image input means for reading and inputting an image of a document;

characteristic amount calculation means for calculating the characteristic amount from said image input from said image input means;

parameter input means for inputting a parameter for image quality adjustment;

user identification information input means for inputting user identification information for discriminating a user of said image processor;

parameter storage means for storing said characteristic amount calculated by said characteristic amount calculation means and said parameter input by said parameter input means for each said user identification information input by said user identification information input means;

parameter decision means for deciding an image quality parameter for adjusting the quality of said image input by said image input means for each said user on the basis of said characteristic amount, said parameter, and said user identification information stored by said storage means;

image processing means for processing said image input by said image input means on the basis of said image quality parameter decided by said parameter decision means; and image output means for outputting said image processed by said image processing means.

5. An image processor according to claim 4, wherein said user identification information input means includes:

a control panel on which identification information comprising alphanumeric characters so as to discriminate a user is input by said user.

6. An image processing system comprising:

an image processor including image input means for reading and inputting an image of a document, characteristic amount calculation means for calculating the characteristic amount from said image input from said image input means, parameter input means for inputting a parameter for image quality adjustment, user identification information input means for inputting user identification information for discriminating a user of said image processor, sending means for sending said characteristic amount calculated by said characteristic amount calculation means, said parameter input by said parameter input means, said user identification information input by said user identification information input means, and device identification information for discriminating said image processor to the outside, receiving means for receiving an image quality parameter for adjusting the quality of said image input by said image input means which is externally decided on the basis of said characteristic amount, said parameter, said user identification information, and said device identification information sent from said sending means and sent from the outside, image processing means for processing said image input by said image input means on the basis of said image quality parameter received from said receiving means; and image output means for outputting said image processed by said image processing means; and a parameter controller for receiving said characteristic amount, said parameter, said user identification information, and said device identification information sent by said sending means of said image processor and controlling an image quality parameter for adjusting the quality of said image input by said image input means on the basis of said received characteristic amount, parameter, user identification information, and device identification information.

7. An image processing method comprising the steps of:

reading and inputting an image of a document;

inputting a parameter for image quality adjustment;

storing said input parameter;

deciding an image quality parameter for adjusting the quality of said image input by said input step on the basis of said stored parameter;

processing said image input by said input step on the basis of said decided image quality parameter; and outputting said processed image, wherein said deciding step decides the mean value of each image quality parameter stored by said storing step which is weighted by frequency as an image quality parameter value for image processing by said processing step.

8. An image processing method comprising the steps of:

reading and inputting an image of a document;

inputting a parameter for image quality adjustment;

storing said input parameter;

deciding an image quality parameter for adjusting the quality of said image input by said input step on the basis of said stored parameter;

processing said image input by said input step on the basis of said decided image quality parameter, said processing step including the steps of;

converting signals R (red), G (green), and B (blue) input in said reading and inputting step to signals C (cyan), M (magenta), and Y (yellow) equivalent to recording signals of said outputting step;

weighting said signals C, M, and Y;

adjusting the density of said signals C, M, and Y weighted in said weighting step;

performing the UCR (under color removal) process for said signals C, M, and Y whose density is adjusted and generating signals C' (cyan), M' (magenta), Y' (yellow), and K (black); and converting said signals C', M', Y', and K generated in said performing step into binary values using the error diffusion method; and outputting said processed image.

9. An image processor comprising:

an imager to read and input an image of a document;

a user interface to input a parameter for image quality adjustment;

a memory to store the parameter input;

a parameter decision unit to determine an image quality parameter for adjusting the quality of the image input by the imager based on the parameter stored in the memory;

a processor to process the image input by the imager based on the image quality parameter; and an image output unit to output the processed image;

wherein the parameter decision unit decides the mean value of each image quality parameter stored in the memory which is weighted by frequency as an image quality parameter value for image processing by the processor.

* * * * *